(12) United States Patent
Stafford

(10) Patent No.: US 6,619,323 B1
(45) Date of Patent: Sep. 16, 2003

(54) REVERSE BOOST VALVE ASSEMBLY

(75) Inventor: Maura Jane Stafford, Grayslake, IL (US)

(73) Assignee: Sonnax Industries, Inc., Bellows Falls, VT (US)

( * ) Notice: Subject to any disclaimer, the term of this patent is extended or adjusted under 35 U.S.C. 154(b) by 0 days.

(21) Appl. No.: 10/226,939

(22) Filed: Aug. 23, 2002

Related U.S. Application Data
(60) Provisional application No. 60/315,180, filed on Aug. 27, 2001.

(51) Int. Cl.$^7$ ............................................. F16K 31/363
(52) U.S. Cl. ................... 137/625.69; 137/271
(58) Field of Search ................ 137/269, 271, 137/625.25, 625.69

(56) References Cited

U.S. PATENT DOCUMENTS 3,847,179 A * 11/1974 Shellman .................. 137/596
4,369,677 A * 1/1983 Lewis ............... 137/625.69 X
4,402,651 A * 9/1983 Ise ........................ 137/271 X
6,289,917 B1 * 9/2001 Gerstenberger ......... 137/269 X

* cited by examiner

Primary Examiner—Kevin Lee
(74) Attorney, Agent, or Firm—Clifford F. Rey

(57) ABSTRACT

A reverse boost valve assembly for installation within the hydraulic pump of an automatic transmission is disclosed. The present invention includes valve pistons that oscillate within close-tolerance mating valve sleeves to minimize hydraulic leakage. The present valve pistons are manufactured from aluminum material and are provided with a hard anodize coating, which produces a low coefficient of friction between the mating surfaces. The valve sleeves are provided with a compatible anodize coating or, in the alternative, are fabricated from highly wear-resistant aluminum material. The reverse boost valve assembly is provided in both standard volume and oversize embodiments, which are interchangeable to permit a predetermined rate of line pressure rise to be selected for a given transmission. The reverse boost valve assembly is also supplied with or without external O-ring seals, which function to prevent line pressure leakage at the interface of the valve sleeve and the hydraulic pump body.

20 Claims, 6 Drawing Sheets

REVERSE BOOST VALVE ASSEMBLY

CROSS-REFERENCE TO RELATED APPLICATION

This patent application claims the benefit under 35 U.S.C. 119(e) of U.S. Provisional Patent Application No. 60/315,180 filed Aug. 27, 2001, entitled Reverse Boost Valve Assembly.

BACKGROUND OF INVENTION

The present invention relates generally to the field of hydraulic circuits utilized in automatic transmission systems and, more particularly, to a direct replacement reverse boost valve assembly for a General Motors 4L60E (hereinafter "GM") transmission that acts to increase hydraulic pump output as engine torque increases and to increase the operating range of line pressure in reverse gear.

Automatic transmission systems of the prior art have a hydraulic circuit subsystem which includes a hydraulic pump having fluid conducting passages or circuits, a valve body having fluid conducting circuits, input and exhaust ports formed within such fluid circuits, and a plurality of spool valves so-called because of their general resemblance to sewing-thread type spools. Such valves are comprised of cylindrical pistons having control diameters or lands formed thereon, which alternately open and close the ports to the fluid circuits to regulate the flow and pressure of automatic transmission fluid (hereinafter "ATF") within the fluid circuits to actuate different components of the transmission. It will be understood that in describing hydraulic circuits, ATF usually changes names when it passes through an orifice or control valve in a specific fluid circuit.

The reverse boost valve is a spool-type valve, which is disposed within a mating sleeve and is installed within the hydraulic pump of the transmission. The reverse boost valve functions in combination with the pressure regulator valve to increase line pressure as engine torque increases. It also functions to increase the operating range of line pressure when the transmission is in reverse gear. Torque signal fluid pressure (this fluid pressure is proportional to engine torque) moves the reverse boost valve piston against the isolator spring located in the hydraulic pump assembly. The isolator spring then transfers the force of the torque signal fluid pressure to the pressure regulator valve, which in turn raises line pressure. Thus, line pressure increases as throttle position and engine torque increase. Reverse input fluid pressure acting on the reverse boost valve also increases the operating range of line pressure when the transmission is in reverse gear.

Line pressure leakage can eventually develop due to the constant oscillation and mechanical wear of the original equipment manufacture (hereinafter "OEM") reverse boost valve piston within its mating sleeve. When this occurs ATF that enters the torque signal orifice in the valve sleeve leaks past the valve piston and exhausts through the reverse input orifice resulting in poor line pressure rise causing clutch/band failure and/or poor shift quality. Similarly, fluid may leak past the valve piston in the opposite direction when fluid enters the valve chamber through the reverse input orifice in reverse gear and escapes via the torque signal orifice.

Thus, the present replacement reverse boost valve has been developed to provide a solution to these problems and other shortcomings of the prior art valve assembly.

SUMMARY OF THE INVENTION

Accordingly, the present invention provides a replacement reverse boost valve assembly wherein the valve piston and mating valve sleeve are manufactured from a high quality aluminum material specifically designed to resist wear. In addition, a wear resistant, hard anodize coating is applied to the valve piston to provide a low coefficient of friction between the mating valve surfaces. The present reverse boost valve assembly is provided in both standard OEM (0.470" spool diameters) and oversize (0.490" spool diameters) with or without O-ring seals. The O-ring seals provide additional protection against leakage through the pump body and maintain pressure in the hydraulic circuits that supply the valve. The variable size spool diameters and optional seal configurations provide for interchangeability of these alternative embodiments in the hydraulic pump to provide an increased rate of line pressure rise for a particular transmission or vehicle use.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENT

Figure 1:
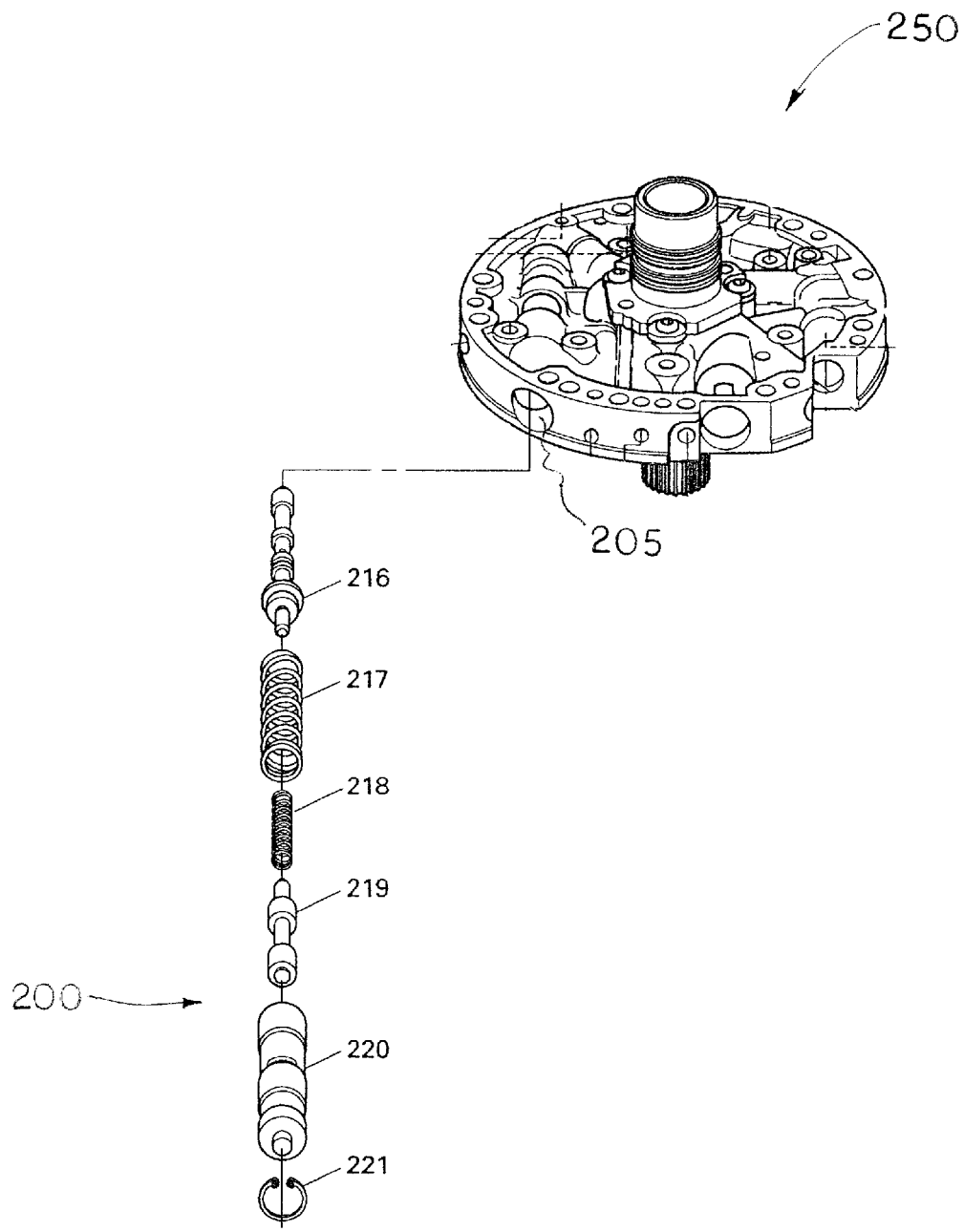
FIG. 1 is an exploded perspective view of the hydraulic pump wherein the present reverse boost valve assembly is utilized and being labeled Prior Art.

With further reference to the drawings there is shown therein a reverse boost valve of the prior art, indicated generally at 200, and illustrated in FIG. 1. The reverse boost valve 200 is shown in exploded view and removed from its functional position within a mating bore as at 205 which is machined into the hydraulic pump, indicated generally at 250, of the GM transmission. It will be understood that the OEM reverse boost valve 200 operates in combination with the pressure regulator valve 216 and isolator spring 217 shown in FIG. 1, which do not form a part of the reverse boost valve assembly 200 for purposes of this application.

In the prior art the reverse boost valve assembly 200 comprises a spool valve including a modified, cylindrical piston 219 having a plurality of concentric diameters or spools, a compression spring 218, and a valve sleeve 220. The reverse boost valve assembly 200, the pressure regulator valve 216, and the isolator spring 217 are arranged coaxially and secured within the bore 205 of the pump assembly 250 by retaining ring 221.

Figure 2:
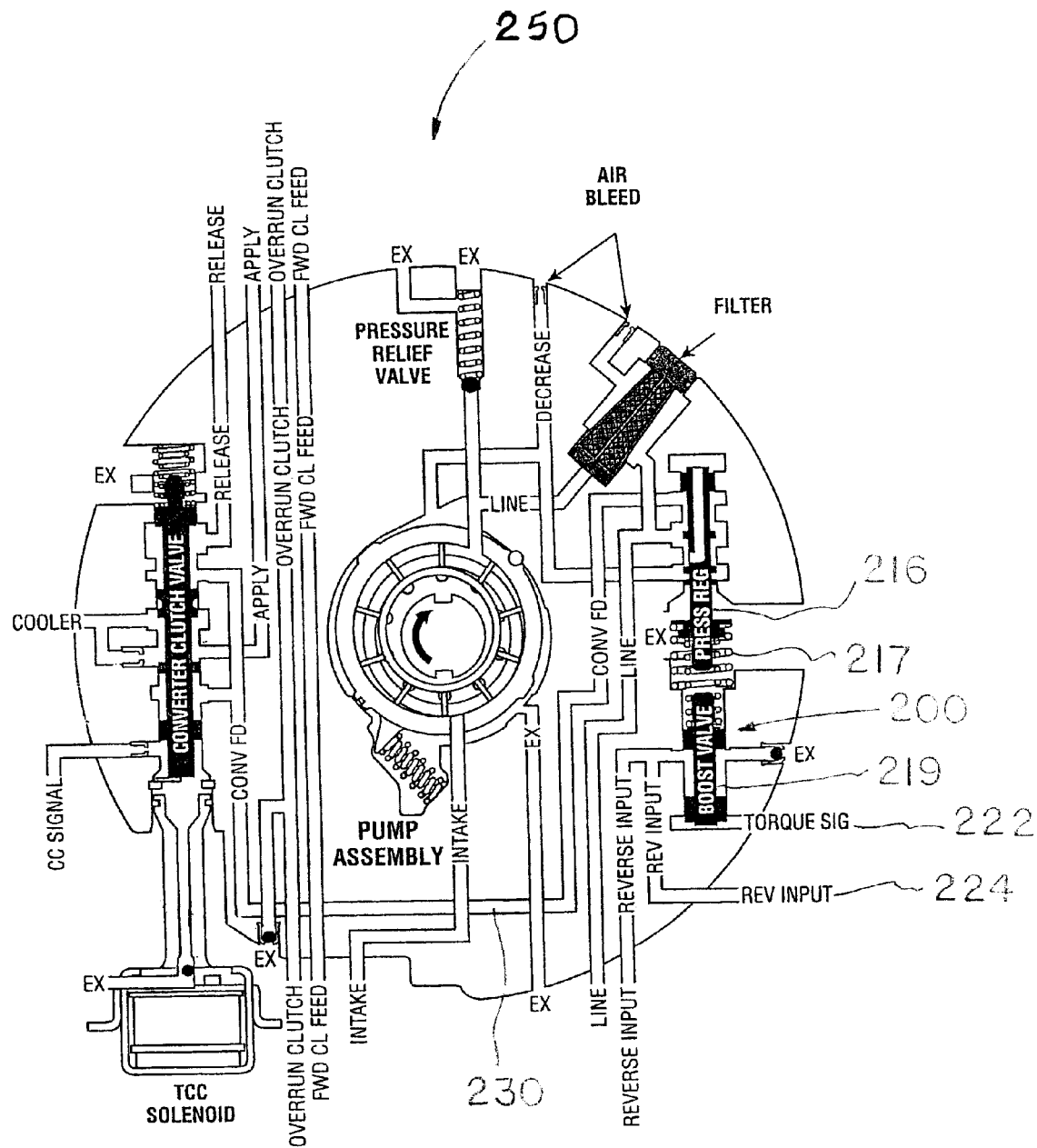
FIG. 2 is a schematic diagram of the hydraulic pump shown in FIG. 1 showing the internal components and circuits thereof and being labeled Prior Art.

Referring to FIG. 2 there is shown a diagrammatic view of the hydraulic pump 250 wherein the OEM reverse boost valve 200 is located. In operation torque signal fluid pressure within the torque signal circuit as at 222 moves the reverse boost valve piston 219 against the isolator spring 217 located in the hydraulic pump assembly 250. The isolator spring 217 then exerts the force received from the torque signal fluid circuit 222 onto the pressure regulator valve 216. Thus, line pressure increases as throttle position and engine torque increase. When the transmission is in reverse gear, reverse input fluid pressure acting on the boost valve 200 via the reverse input circuit as at 224 increases the operating range of line pressure in reverse gear.

Figure 3:
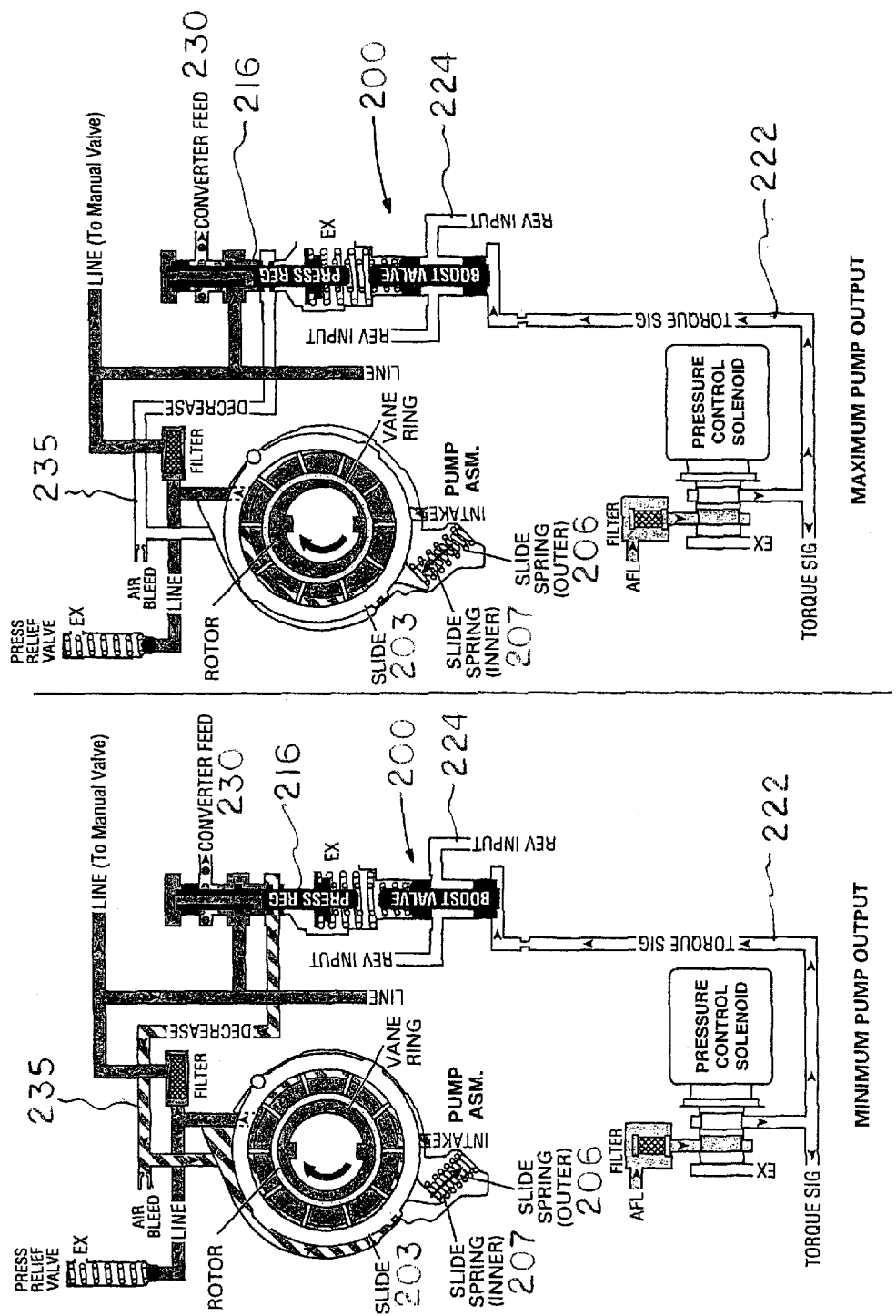
FIG. 3A is a schematic diagram showing the hydraulic pump in a minimum output condition.
FIG. 3B is a schematic diagram showing the hydraulic pump in a maximum output condition.

As shown in FIGS. 3A and 3B, the pressure regulator valve 216 routes pressure into both the converter feed circuit as at 230 and the decrease fluid circuit 235. Converter feed fluid is routed to both the torque converter and cooler fluid circuits (not shown). Decrease fluid pressure as at 235 moves the pump slide 203 against the force of the pump slide springs (outer, 206 and inner, 207). Decrease fluid pressure and the position of the pump slide 203 constantly vary in relation to torque signal fluid pressure as at 222 and engine torque as controlled by the pressure regulator valve 216.

Vehicles with the GM transmission frequently have poor line rise (i.e. insufficient increase in line pressure), which can result in 3–4 clutch failure, 2–4 band failure, and poor shift quality. These problems can be caused by the oscillating action of the boost valve piston 219, which causes abrasion and mechanical wear on the inside diameter of the sleeve 220. When this occurs, ATF that enters the OEM boost valve 200 via the torque signal circuit 222 leaks past the boost valve piston 219 and exhausts through the reverse input circuit 224 resulting in poor line rise. In addition, reverse input pressure at 224 can leak around the boost valve piston 219 and exhaust through the torque signal circuit 222 in the opposite direction when operating in reverse gear.

Further, in the OEM boost valve 200 leakage of line pressure occurs at the interface of the outside diameter of the metallic sleeve 220 and the mating bore 205 in the aluminum pump body (FIG. 1), which contributes to aforementioned insufficient line rise and shift quality problems. Thus, the present invention has been developed to provide a replacement reverse boost valve assembly to correct these problems and will now be described.

Figure 4:
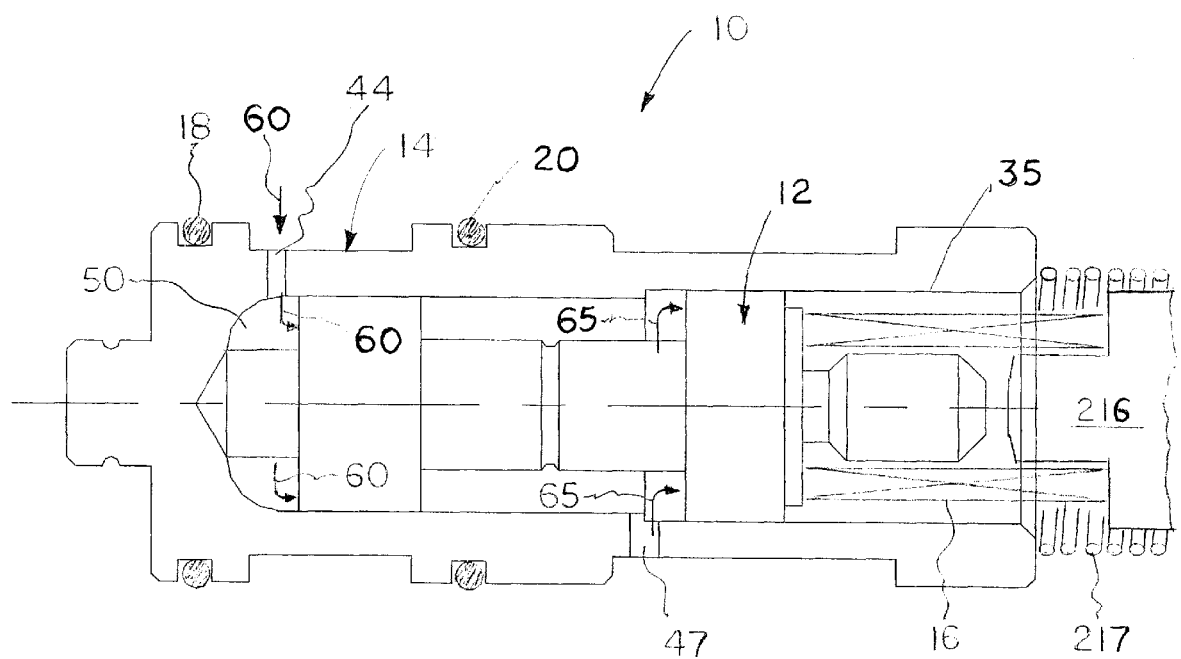
FIG. 4 is a longitudinal cross-section of the reverse boost valve assembly of the present invention.

Referring to FIG. 4 there is shown therein a reverse boost valve assembly in accordance with the present invention, indicated generally at 10. The present invention is designed as a direct replacement for the OEM reverse boost valve 200 that is standard equipment installed in the hydraulic pump 250 of the GM transmission provided on many General Motors vehicles.

The present reverse boost valve assembly 10 is a spool-type valve comprised of a valve piston, indicated generally at 12, a cylindrical valve sleeve, indicated generally at 14, and a compression spring 16. In the embodiment shown the present reverse boost valve assembly 10 also includes O-ring seals 18, 20, which function to prevent ATF leakage and line pressure depletion at the interface of sleeve 14 and bore 205 (FIG. 1).

Figure 5:
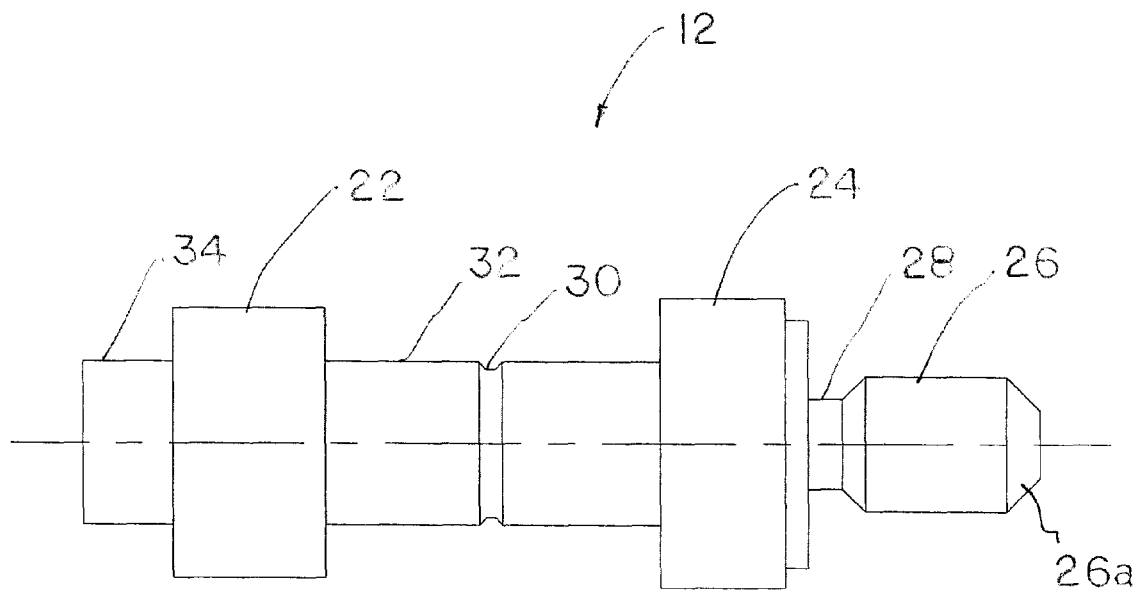
FIG. 5 is an elevational view of the valve piston of the present invention.

FIG. 5 illustrates the valve piston 12 showing the structural features thereof in further detail. In the preferred embodiment the valve piston 12 is constructed of Aluminum Association (hereinafter "AA") 6262-T8/T9, AA 6061-T6 aluminum, or other suitable material for this application. The valve piston 12 includes control diameters or spools 22, 24, which function to regulate the flow of ATF within the valve.

More particularly, valve piston 12 includes a spring guide diameter 26 of sufficient size to support the compression spring 16 in the position shown. The terminal end 26a of the spring guide diameter 26 is chamfered to avoid entanglement with spring 16 during installation. An opposite end of spring guide diameter 26 is integrally connected to relief diameter 28 that, in turn, connects the spring guide diameter 26 with an adjacent first end face of spool 24, which functions as a seating surface for spring 16. A contoured stem 32 including the annular identification groove 30 formed thereon integrally connects the spool 24 to the adjacent EPC spool 22 on a first end face thereof. On the opposite end face the EPC spool 22 is integrally connected to a smaller stop diameter 34, which limits the travel of the valve piston 12 within the sleeve 14.

Compression spring 16 is manufactured from a suitable material such as steel wire in accordance with commercial specifications and calibrated to provide a specific spring rate and desired operating characteristics for a given valve application.

The valve piston 12 is coated with a hard anodized finish in accordance with MIL-A-8625, Type III, Class 2, to produce 0.02+/−0.01 millimeters build up per surface providing improved wear characteristics.

Figure 6:
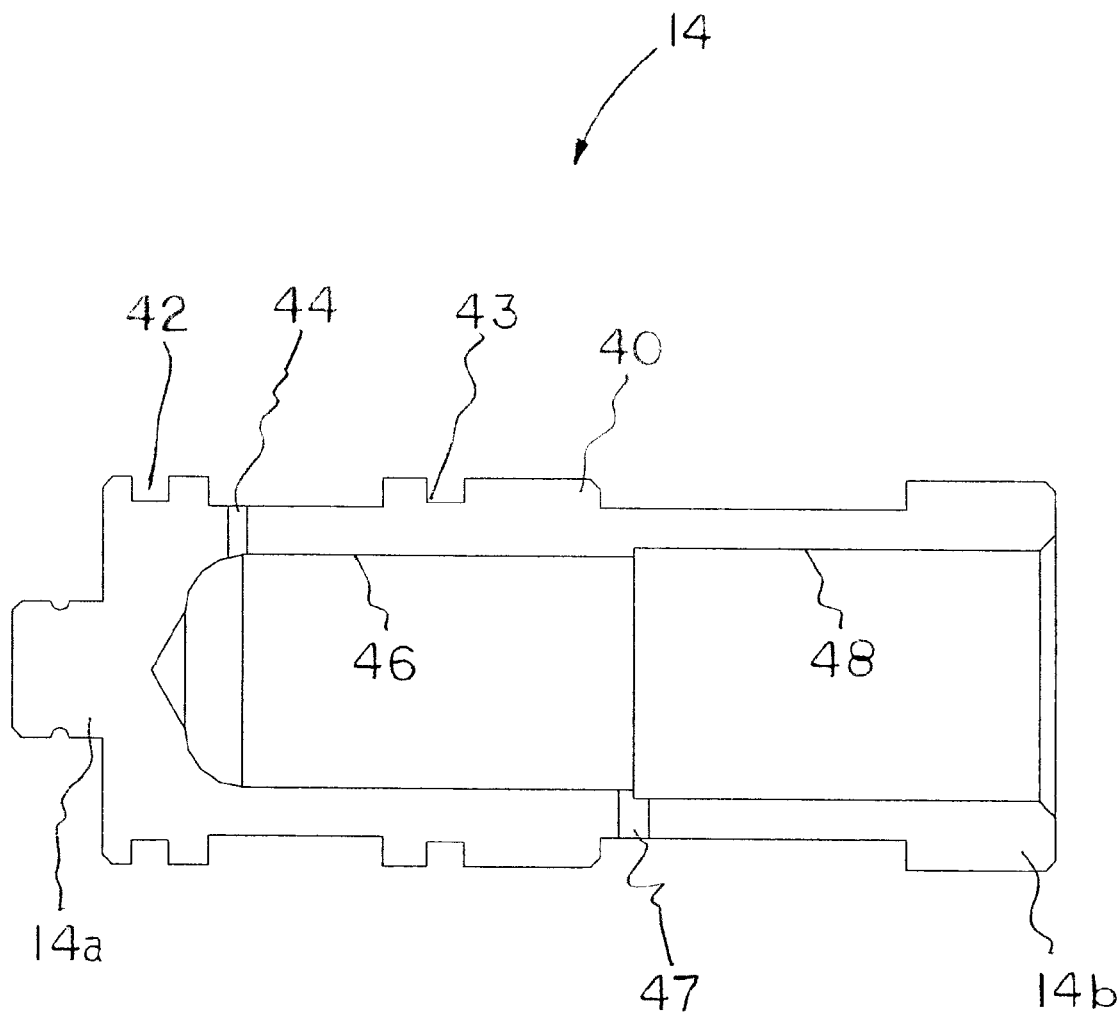
FIG. 6 is a longitudinal cross-section of the one embodiment of the valve sleeve of the present invention including external O-ring grooves.

FIG. 6 illustrates the valve sleeve 14 showing its structural features in further detail. In one embodiment, among others, the valve sleeve 14 is constructed of AA 4032-T6/T651/T86 aluminum sold under the trademark, Deltalloy®, which includes a high percentage of silicon to provide exceptional resistance to abrasion and mechanical wear. In an alternative embodiment, the sleeve 14 is fabricated from AA 6061-T6 aluminum, which is subsequently hard anodized per MIL-A-8625, Type III, Class 2 to yield a build up of 0.02+/−0.01 millimeters per surface. Valve piston 12 and sleeve 14 are matched during the manufacturing process to provide a close-tolerance fit to facilitate rapid oscillation of the valve piston within the sleeve during operation.

The combination of either the hard anodize finish on both piston 12 and sleeve 14 or, in the alternative, the hard anodize finish on the piston 12 and the AA 4032-T6/T651/T86 (Deltalloy®) aluminum sleeve 14 (without anodization) provides a low coefficient of friction between the mating surfaces and, thus, increased lubricity and service longevity for the present valve.

Still referring to FIG. 6 sleeve 14 is comprised of a cylindrical body 40 including a primary bore 46 and a coaxial counterbore 48. At least one torque signal orifice 44 is formed at the inner end 14a of sleeve 14 in fluid communication with the torque signal circuit 222. In one embodiment, among others, the torque signal orifice 44 is calibrated within the range of Ø0.037–0.041 inches to regulate ATF within the valve chamber 50 to the desired operating pressure. Similarly, at least one reverse input orifice 47 is formed at the juncture of bore 46 and counterbore 48 in fluid communication with the reverse input circuit 224. In one embodiment, among others, the reverse input orifice 47 is calibrated within the range of Ø0.059–0.063 inches to regulate ATF pressure in reverse gear. If increased reaction time (i.e. faster line rise) is desired the orifices 44, 47 may be enlarged.

In the embodiment shown in FIG. 6, a pair of annular grooves 42, 43 are formed about the circumference of sleeve 14, which receive O-ring seals 18, 20 respectively or other sealing rings that serve to prevent leakage of line pressure at the interface of sleeve 14 and the bore 205 within the pump.

Referring again to FIG. 4, the function of the replacement reverse boost valve assembly 10 will now be described. The present reverse boost valve assembly 10 is normally biased to the position shown in FIG. 4 by spring 16, which permits the flow of ATF into the valve chamber 50 at line pressure through the torque signal orifice 44 as shown by directional arrows 60. Torque signal fluid pressure moves the boost valve piston 12 (i.e. to the right in FIG. 4) against the OEM pressure regulator isolator spring 217, which acts against the pressure regulator valve (FIG. 1) to generate a higher line pressure as described hereinabove in relation to FIGS. 3A and 3B. When the vehicle is in reverse gear, ATF also enters the valve chamber 50 through reverse input orifice 47 as shown by directional arrows 65 via the reverse input circuit 224 and strokes the valve piston 12 (i.e. to the right in FIG. 4) to boost line pressure.

The present reverse boost valve assembly 10 is provided in alternative embodiments in a kit format wherein the EPC spool 22 of valve piston 12 and mating bore 46 of sleeve 14 are available in both the OEM standard (0.470" spool diameter) and also an oversize (0.490" spool diameter). In addition, these alternative embodiments are available either with or without O-ring seals 18, 20 and their corresponding annular grooves 42, 43. The variable size spool diameter and optional O-ring seal configuration provides a system for selective use of such alternative embodiments of the present reverse boost valve assembly 10 in a transmission to provide firmer shifts and/or faster line pressure rise to match a given vehicle use and/or driving application.

In an installation procedure for the present reverse boost valve 10, the OEM valve assembly 200 is initially removed from the pump assembly 250 and discarded. Next, a valve kit of the desired standard or oversize configuration is selected for reassembly. Thereafter, the O-rings 18 and 20 are lubricated and installed in the annular grooves 42, 43 on the sleeve 14, if applicable. Next, the valve piston 12 and spring 16 are carefully inserted into the mating sleeve 14, which is lubricated and placed in engagement with the pressure regulator valve within the bore 205, and secured with the OEM retaining clip 221 (FIG. 1).

Thus, it can be seen that the present invention provides a direct replacement reverse boost valve assembly 10 that is resistant to wear and reduces torque signal circuit leakage, which can result in clutch/band failure and poor shift quality. In addition, the close-tolerance fit within the mating valve sleeve 14 and the hard anodize finish applied to valve piston 12 increases service longevity.

The present reverse boost valve assembly 10 is provided in alternative embodiments in a kit format wherein the valve piston and mating sleeve are available in both the OEM standard (0.470" spool diameter) and also an oversize (0.490" spool diameter). Such alternative embodiments are available either with or without O-ring seals and their corresponding annular grooves. The variable size spool diameter and optional O-ring seal configuration provides for selective use and interchangeability of the present valve assembly in a given transmission to provide firmer shifts and/or faster line pressure rise to match a specific driving application.

Although not specifically illustrated in the drawings, it should be understood that additional equipment and structural components will be provided as necessary and that all of the components described above are arranged and supported in an appropriate fashion to form a complete and operative AFL valve mechanism incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A reverse boost valve assembly for use in combination with a pressure regulator valve installed within the hydraulic pump of an automatic transmission, said reverse boost valve assembly being disposed in fluid communication with a torque signal fluid circuit and a reverse input circuit, said reverse boost valve assembly comprising:

a valve sleeve including a longitudinal bore, wherein said bore defines a valve chamber, said valve sleeve further including at least one torque signal fluid orifice formed in fluid communication with said valve chamber and the torque signal fluid circuit and at least one reverse input orifice formed in fluid communication with said valve chamber and the reverse input circuit;

a valve piston disposed within said longitudinal bore, said valve piston including a plurality of control lands formed thereon, wherein said control lands are responsive to the ingress of hydraulic fluid into said valve chamber from the torque signal circuit and the reverse input circuit, said valve piston further including a hard anodize coating to produce a low coefficient of friction between the mating surfaces of said piston and said sleeve; and at least one compression spring disposed intermediate said valve piston and the pressure regulator valve, wherein said spring functions to bias said valve piston to a closed position and, in the alternative, to shift the pressure regulator valve to an open position upon the ingress of hydraulic fluid into said valve chamber thereby increasing the rate of line pressure rise.

2. A reverse boost valve assembly of claim 1 wherein said valve sleeve further includes sealing means comprising a plurality of O-ring seals disposed within a plurality of annular grooves formed about the circumference of said valve sleeve for sealing the interface of said sleeve and the hydraulic pump.

3. A reverse boost valve assembly of claim 1 wherein said torque signal fluid orifice measures in the range of Ø0.037–0.041 inch.

4. A reverse boost valve assembly of claim 3 wherein said reverse input orifice measures in the range of Ø0.059–0.063 inch.

5. A reverse boost valve assembly of claim 1 wherein said valve sleeve is fabricated from a wear-resistant aluminum in accordance with AA T6/T651/T86 material standard.

6. A reverse boost valve assembly of claim 5 wherein said valve piston is fabricated from wear-resistant aluminum in accordance with AA 6262-T8/T9 material standard.

7. A reverse boost valve assembly of claim 6 wherein a hard anodize coating is applied to said valve piston in accordance with military standard MIL-A-8625, Type III, Class 2, to yield a build up of 0.02+/−0.01 millimeters per surface.

8. A reverse boost valve assembly replacement system for use in combination with the pressure regulator valve within the hydraulic pump of an automatic transmission, said system comprising:

a plurality of interchangeable valve sleeves each including a longitudinal bore, wherein said bore defines an internal valve chamber of a predetermined volume, at least one of said valve sleeves conforming to a standard dimension and at least one of said valve sleeves conforming to an oversize dimension;

a plurality of valve pistons for mating engagement within said valve sleeves, wherein at least one of said valve pistons conforms to said standard dimension and at least one of said valve pistons conforms to said oversize dimension such that said valve sleeves and said valve pistons are provided in a matched set to provide interchangeable reverse boost valve assemblies for controlling hydraulic line pressure rise to a predetermined rate for a specific transmission; and at least one compression spring disposed intermediate said valve piston and the pressure regulator valve, wherein said spring functions to bias said valve piston to a closed position and, in the alternative, to shift the pressure regulator valve to an open position upon the ingress of hydraulic fluid into said valve chamber thereby increasing the rate of line pressure rise within the transmission.

9. A reverse boost valve assembly replacement system of claim 8 wherein said valve sleeves further include sealing means disposed about the circumference thereof to prevent line pressure leakage within the hydraulic pump.

10. A reverse boost valve assembly replacement system of claim 9 wherein said sealing means comprises at least one O-ring seal disposed within at least one annular groove formed about the circumference of each of said valve sleeves for sealing the interface of said sleeves and the hydraulic pump.

11. A reverse boost valve assembly replacement system of claim 8 wherein said valve sleeves include at least one torque signal fluid orifice formed in fluid communication with said valve chamber and the torque signal fluid circuit and at least one reverse input orifice formed in fluid communication with said valve chamber and the reverse input circuit.

12. A reverse boost valve assembly replacement system of claim 11 wherein said torque signal fluid orifice measures in the range of Ø0.037–0.041 inch.

13. A reverse boost valve assembly of claim 12 wherein said reverse input orifice measures in the range of Ø0.059–0.063 inch.

14. A reverse boost valve assembly replacement system of claim 11 wherein said valve sleeves are fabricated from wear-resistant aluminum in accordance with AA 4032-T6/T651/T86 material standard.

15. A reverse boost valve assembly replacement system of claim 8 wherein said valve pistons include a plurality of control lands formed thereon, said control lands being responsive to the ingress of hydraulic fluid into said valve chamber from the torque signal circuit and the reverse input circuit.

16. A reverse boost valve assembly replacement system of claim 15 wherein said valve pistons are fabricated from wear-resistant aluminum in accordance with AA 6262-T8/T9 material standard.

17. A reverse boost valve assembly replacement system of claim 16 wherein a hard anodize coating is applied to said valve pistons to produce a low coefficient of friction between the mating surfaces of said piston and said sleeve.

18. An improved hydraulic pump assembly for use in an automatic transmission, said pump assembly comprising a reverse boost valve assembly operated in combination with a pressure regulator valve to regulate hydraulic fluid pressure within the transmission, said reverse boost valve assembly being disposed in fluid communication with the torque signal fluid circuit and the reverse input circuit integrally formed within said pump assembly, the improvements comprising:

a plurality of interchangeable reverse boost valve assemblies each comprising a valve sleeve including a longitudinal bore defining an internal valve chamber, at least one of said valve sleeves conforming to a standard dimension and at least one of said valve sleeves conforming to an oversize dimension, said reverse boost valve assemblies further comprising a plurality of valve pistons for mating engagement within said valve sleeves, wherein at least one of said valve pistons conforms to said standard dimension and at least one of said valve pistons conforms to said oversize dimension such that said valve sleeves and said valve pistons are paired in a matched set to provide for interchangeability of said reverse boost valve assemblies within said pump to regulate hydraulic line pressure rise to a predetermined rate.

19. An improved hydraulic pump assembly of claim 18 wherein said valve sleeves further comprise sealing means including a plurality of O-ring seals disposed within a plurality of annular grooves formed about the circumference of said valve sleeves for sealing the interface of said sleeves and said pump.

20. An improved hydraulic pump assembly of claim 18 wherein a hard anodize coating is applied to said valve pistons to produce a low coefficient of friction between the mating surfaces of said piston and said sleeve.

* * * * *